United States Patent [19]

Sterrenberg

[11] 4,393,599
[45] Jul. 19, 1983

[54] LEVELING MECHANISMS FOR HAND-HELD POWER DRILL

[75] Inventor: John W. Sterrenberg, 8350 E. McKellips Rd. #146, Scottsdale, Ariz. 85257

[73] Assignee: John W. Sterrenberg, Scottsdale, Ariz.

[21] Appl. No.: 183,183

[22] Filed: Sep. 2, 1980

[51] Int. Cl.³ .................... G01C 9/28; B23B 49/00
[52] U.S. Cl. ........................................ 33/336; 33/347
[58] Field of Search ............... 33/334, 347, 370, 371; 408/16, 80

[56] References Cited

U.S. PATENT DOCUMENTS

| | | |
|---|---|---|
| 2,767,483 | 10/1956 | Sauer . |
| 3,664,032 | 5/1972 | Tompkins ............................ 33/334 |
| 3,664,754 | 5/1972 | Kelbel . |
| 3,807,051 | 4/1974 | Funakubo ............................ 33/334 |
| 3,864,839 | 2/1975 | Wolf . |
| 3,884,593 | 5/1975 | Christoffer ...................... 33/334 X |
| 4,141,151 | 2/1979 | Jansky . |
| 4,154,001 | 5/1979 | Serafin . |

OTHER PUBLICATIONS

Product Specification Manual, Portalign Tool Corp., "Portalign" Drill Guide Model Nos. 101-A, 101-1B etc.

Promotional Brochure Form No. 0541, Black & Decker, "Guidemate", Model No. 79-015.

Primary Examiner—William D. Martin, Jr.
Attorney, Agent, or Firm—Cahill, Sutton & Thomas

[57] ABSTRACT

A leveling mechanism having bubble levels is removably attachable to a hand-held power drill. In one form, the leveling mechanism includes a drive shaft coupled between the drill and a chuck for rotation therewith. The drive shaft is rotatably mounted to a support, and the support is held stationary relative to the drill housing. The support may include first and second surfaces parallel and perpendicular, respectively, to the axis of rotation of the drive shaft for supporting first and second bubble levels. Alternatively, the support may include a support plate and a level plate hinged thereto for supporting one or more bubble levels; a grooved alignment plate engages the edges of the support plate and level plate for maintaining a predetermined angular relationship therebetween. In another form, the leveling mechanism is removably attached to the front face of the drill housing. A circular projection extends from the front face of the drill housing, and the leveling mechanism extends around the outer periphery of the projection; a collar threadedly engages the inner periphery of the projection for securing the leveling mechanism to the drill.

22 Claims, 18 Drawing Figures

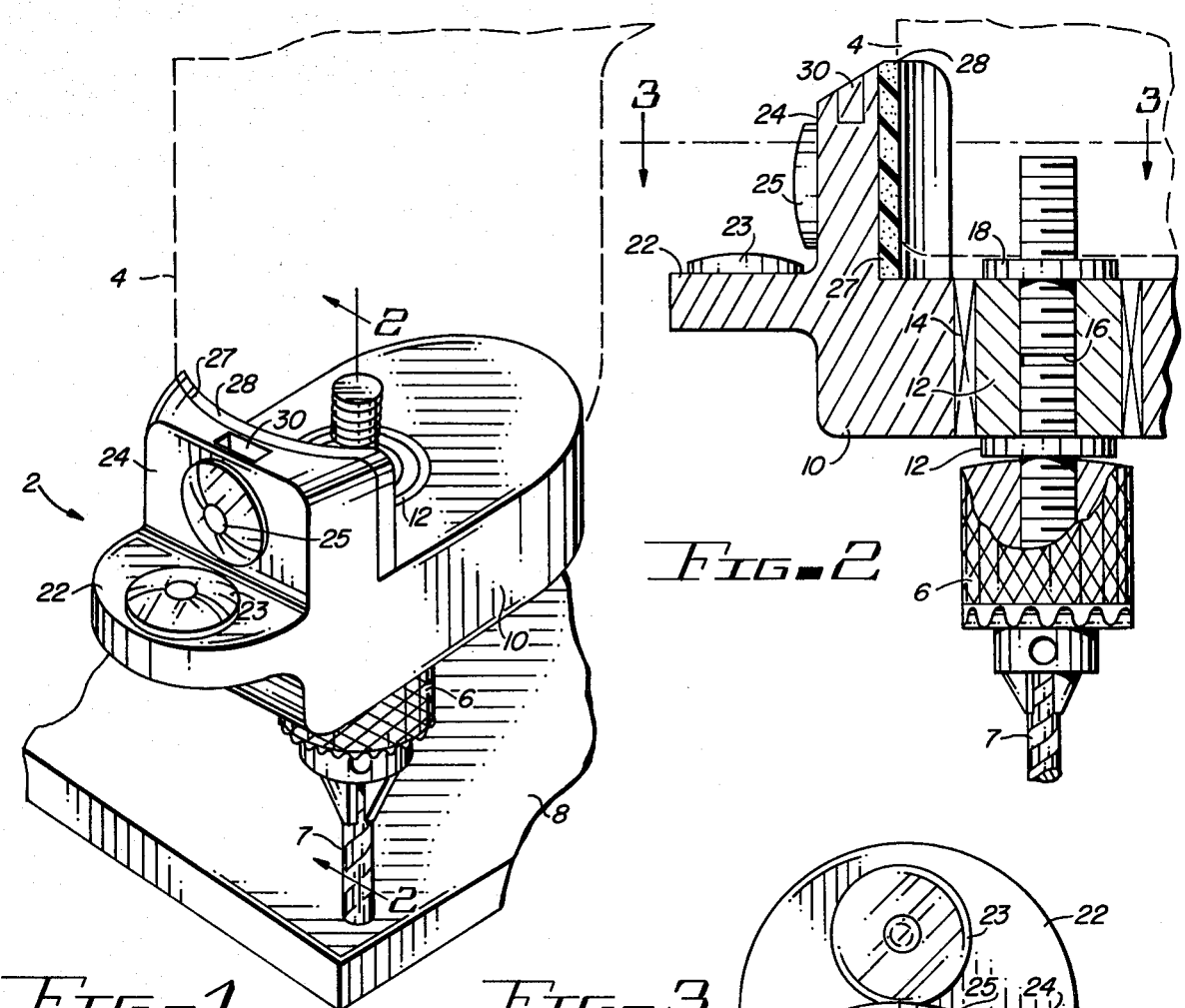
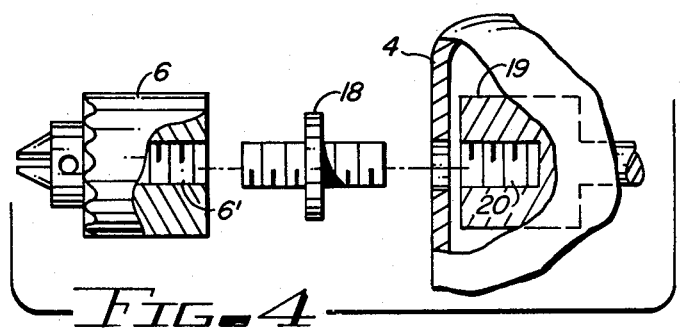
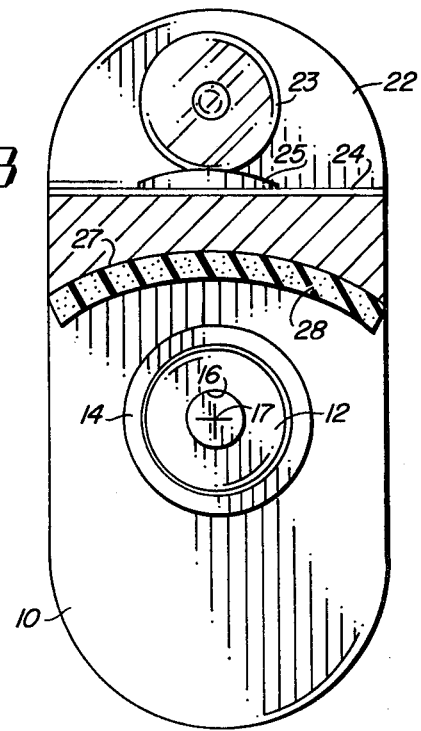
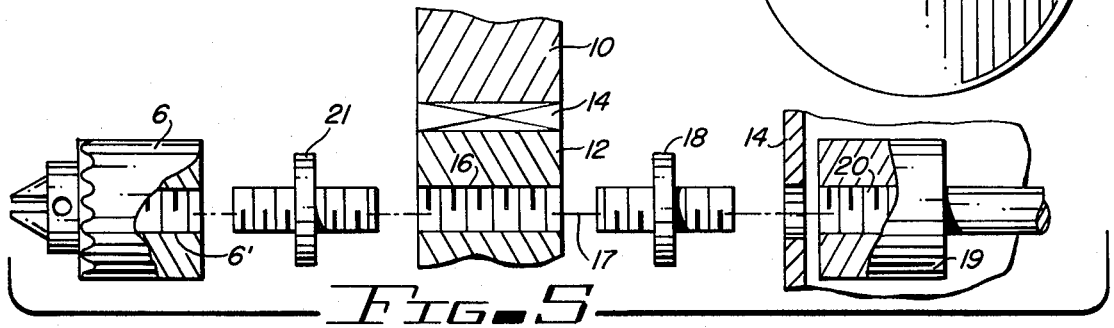

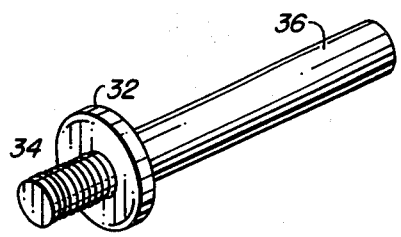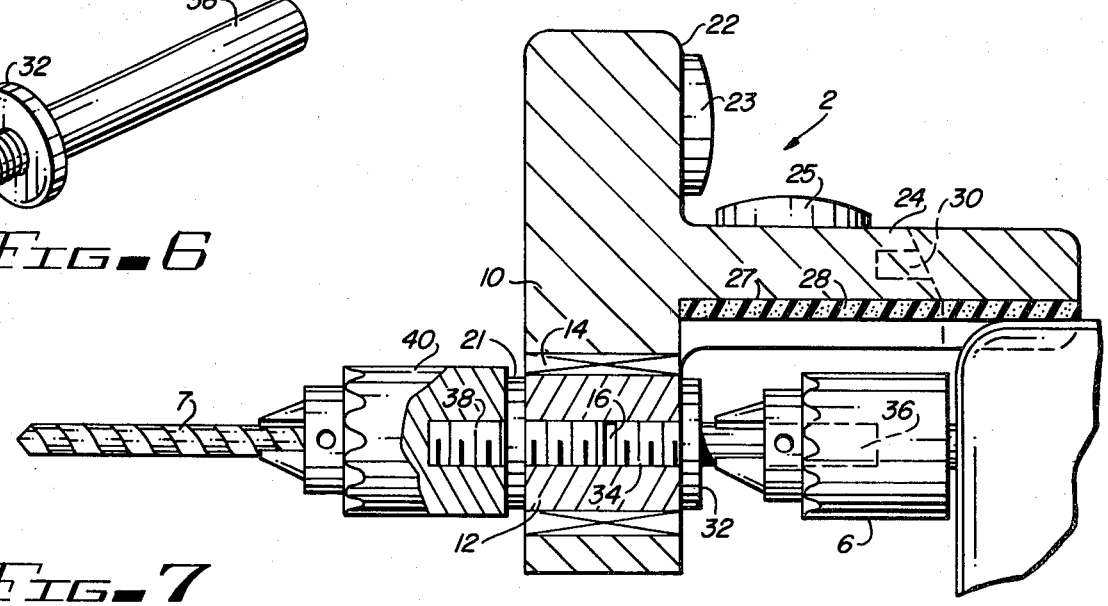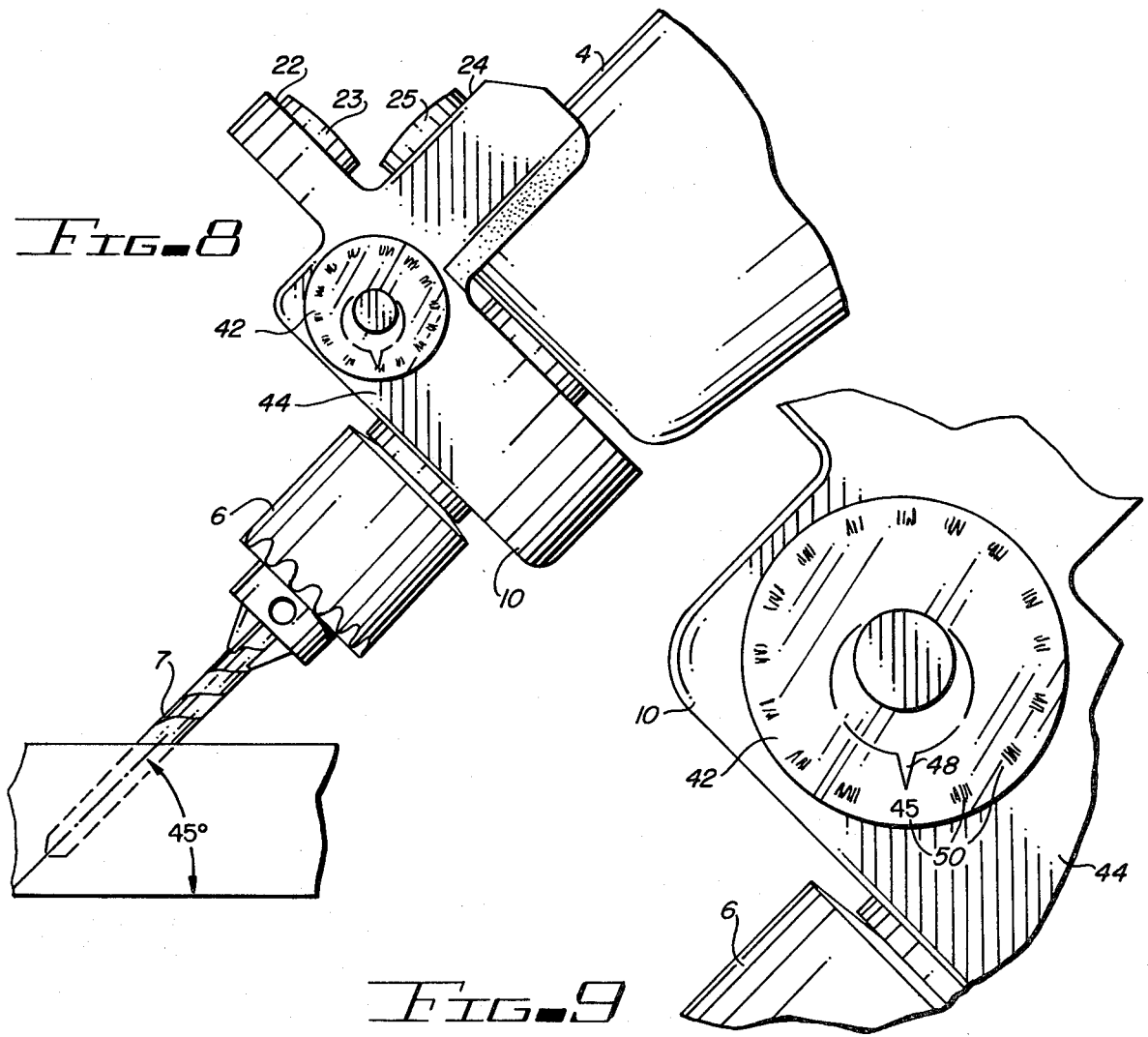

LEVELING MECHANISMS FOR HAND-HELD POWER DRILL

BACKGROUND OF THE INVENTION

1. Field of the Invention

The present invention relates generally to accessories for hand-held power drills, and more particularly, to a leveling mechanism for drilling a hole along a horizontal or vertical axis.

2. Description of the Prior Art

In using a hand-held power drill, it is often necessary to drill a hole having a horizontal or vertical axis. Various mechanisms for use in conjunction with hand-held power drills are well known in the art for aiding the operator in guiding the drill bit in a horizontal or vertical manner. Often, the work surface into which the hole is to be drilled is itself disposed vertically or horizontally, and the drill bit need only be maintained perpendicular to the work surface. Prior art devices are known for maintaining the drill bit perpendicular to the work surface. One such prior art device is a drill guide of the type commercially available from Portalign Tool Corporation of San Diego, Calif. under the registered trademark "PORTALIGN". The drill guide includes a base for resting against the work surface, a pair of guide rods extending upwardly from the base, and an adaptor which slidingly engages the guide rods. The adaptor is attached to the drive shaft of the drill for guiding the drill bit perpendicular to the work surface. However, the base of the drill guide tends to obscure the work area during drilling, often making drilling more difficult. In addition, such drill guides are not easily used to drill a horizontal or vertical hole if the work surface is not itself vertically or horizontally disposed.

Other types of drill guides which are adapted to rest against the work surface but attach to the drill housing rather than to the drive shaft of the drill are also known. For example, a drill guide available from Black & Decker, Inc. of Towson, Md., under the trademark "GUIDEMATE", includes a track which can be supported perpendicular to the work surface and a carrier which slides within the track. The carrier is clamped to the drill housing for guiding movement of the drill along the track. This type of drill guide has less of a tendency to obscure the work area during drilling. However, because the drill guide is attached to the drill housing rather than to the drive shaft of the drill, proper alignment between the drilling axis and the drill guide is difficult to achieve. This difficulty in achieving proper alignment is aggravated by the variety of drill housing contours utilized by the various manufacturers of hand-held power drills now available.

Other prior art devices are also known wherein bubble levels are utilized in conjunction with a hand-held power drill for allowing a hole to be drilled along a horizontal or vertical axis. Often, the bubble levels are removably attached to the outer periphery of the drill housing or handle without requiring modification of the drill itself. U.S. Pat. Nos. 4,154,001 (Serafin), 4,141,151 (Jansky), and 2,768,483 (Sauer, Jr.) each disclose a bubble level mechanism which is clamped to the drill housing or handle by a band or bracket. However, drill housings often lack planar surfaces that are perfectly parallel or perpendicular to the drilling axis for supporting such bubble level mechanisms. Accordingly, these prior art devices must be carefully adjusted and positioned prior to use in order to properly align the bubble level with the drilling axis. For example, in the above-identified patent to Sauer, Jr., the leveling mechanism disclosed therein is provided with a plurality of adjusting screws for aligning the plane of the bubble level relative to the drilling axis. Similarly, in the above-identified patent to Serafin, a foot positioning device must be inserted within the chuck of the drill to properly position the leveling mechanism relative to the drilling axis before the hole can be drilled. Moreover, leveling mechanisms of the type which are removably attached to the drill housing typically require readjustment each time the leveling mechanism is removed and subsequently reattached to the drill housing.

Prior art leveling mechanisms of the type disclosed by the above-identified patent to Serafin include a bubble level which can be positioned at various angles relative to the drilling axis. However, each time that the angular relationship between the bubble level and the drilling axis is changed, the position of the bubble level must be carefully readjusted. Typically, the operator would need to reinsert the foot positioning device within the chuck to readjust the position of the bubble level. It is therefore difficult to accurately and repeatedly alternate the position of the bubble level from among various desired angular relationship with the drilling axis.

Also disclosed in the prior art are drills which have been modified to incorporate bubble levels therein. For example, U.S. Pat. Nos. 3,864,839 (Wolf), and 3,664,754 (Kelbel) each disclose such a drill. However, drills of the type disclosed in the above-identified patents must be substantially modified from hand-held power drills of the type generally available because the drill housings of conventional drills often lack planar surfaces that are perfectly parallel or perpendicular to the drilling axis and against which such bubble levels may be supported.

Accordingly, it is an object of the present invention to provide a leveling mechanism for use in conjunction with virtually any conventional hand-held power drill wherein the leveling mechanism is readily attachable to and removable from the drill, and wherein proper alignment of the leveling mechanism with the drilling axis is ensured upon attachment of the leveling mechanism to the drill.

It is another object of the present invention to provide a leveling mechanism for use in conjunction with a hand-held power drill wherein the leveling mechanism does not obscure the work surface into which the hole is to be drilled.

It is a further object of the present invention to provide a drill having a housing particularly adapted to engage a removable leveling mechanism.

It is still a further object of the present invention to provide a leveling mechanism for use in conjunction with a hand-held power drill wherein the leveling mechanism can be accurately and repeatedly positioned at a plurality of predetermined angular relationships to the drilling axis.

These and other objects of the present invention will become apparent to those skilled in the art as the description thereof proceeds.

SUMMARY OF THE INVENTION

Briefly described, and in accordance with one embodiment thereof, the present invention relates to a leveling mechanism for use in conjunction with a hand-held power drill wherein the leveling mechanism is removably attachable to the drill in a manner which readily achieves proper alignment between the leveling mechanism and the drilling axis. The leveling mechanism includes a support attached to the drill and at least a first bubble level attached to the support. In one form of the present invention, the leveling mechanism further includes a drive shaft rotatably mounted to the support and coupled to a rotatable drive member of the drill for effecting attachment of the support to the drill. The drive shaft further couples a chuck to the rotatable drive member of the drill for rotation therewith. The support is secured to the drill housing to prevent rotation of the support when the drive shaft is rotated during operation of the drill. The support may include first and second planar surfaces perpendicular and parallel, respectively, to the axis of rotation of the drive shaft for supporting the first bubble level and a second bubble level, respectively.

In another form of the present invention, the above-mentioned support may include a support plate attached to the drill and a level plate hinged to the support plate for supporting at least a first bubble level. A grooved alignment plate releasably engages the edges of the support plate and level plate for maintaining a predetermined angular relationship therebetween.

In still another form, the present invention relates to an apparatus including a hand-held power drill having a housing which includes a projection extending from the front face thereof, the projection surrounding an aperture in the drill housing through which a drive shaft extends for coupling a chuck to the drill. A support is provided for supporting at least a first bubble level, the support having a first hole for surrounding the outer periphery of the projection extending from the front face of the drill housing. The support is secured against the front face of the drill housing. Preferably, the inner periphery of the projection extending from the front face of the drill housing is circular and threaded, and a rimmed collar threadedly engages the inner periphery of the projection for urging the support against the front face of the drill housing.

BRIEF DESCRIPTION OF THE DRAWINGS

FIG. 1 is a perspective view of a leveling mechanism including a drive shaft coupled between a drill and a chuck according to the teachings of the present invention.

FIG. 2 is a cross-sectional view of the leveling mechanism shown in FIG. 1 taken through lines 2—2.

FIG. 3 is a cross-sectional view taken through lines 3—3 as shown in FIG. 2.

FIG. 4 is an exploded, partial cross-sectional view of the front portion of a conventional drill.

FIG. 5 is an exploded, partial cross-sectional view illustrating the manner in which the leveling mechanism shown in FIG. 1 is coupled between the chuck and the rotatable drive member within the drill housing.

FIG. 6 is a perspective view of an arbor used in conjunction with the leveling mechanism shown in FIG. 7.

FIG. 7 is a leveling mechanism for use in conjunction with a hand-held power drill of the type having an integral chuck.

FIG. 8 illustrates a leveling mechanism of the type shown in FIG. 1 and incorporating an angle indicator.

FIG. 9 is an enlarged view of the angle indicator shown in FIG. 8.

DETAILED DESCRIPTION OF THE PREFERRED EMBODIMENTS

Figure 10:
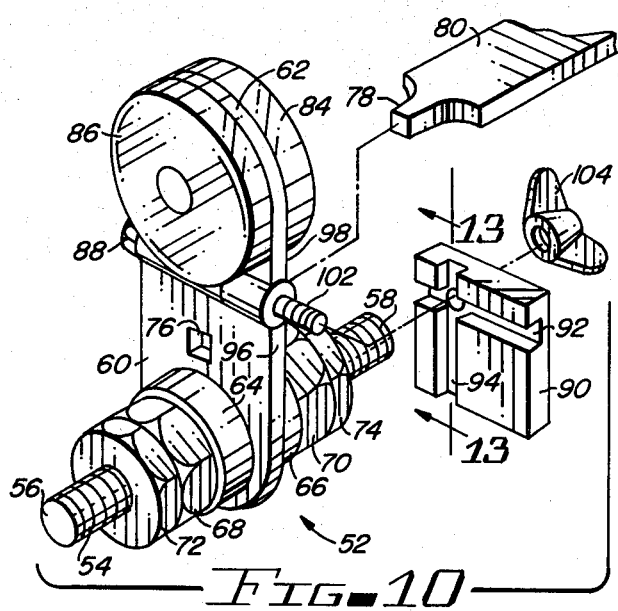
FIG. 10 is a partially exploded perspective view of a leveling mechanism having a rotatable drive shaft and including a hinged support for supporting a bubble level.

In FIG. 1, a leveling mechanism, designated generally by reference numeral 2, is shown for use in conjunction with a hand-held power drill, designated by dashed lines 4. A rotatable chuck 6 is coupled to leveling mechanism 2 opposite drill 4 in order to secure a drill bit 7 for drilling a hole in workpiece 8.

Referring now to FIGS. 1-3, and FIG. 5, leveling mechanism 2 includes a support 10 and a drive shaft 12. Support 10 includes a bearing surface 14 for rotatably securing drive shaft 12 therein. Bearing surface 14 may be a bronze bushing of the type commercially available under the designation "Oil-Lite"; alternatively, bearing surface 14 may include a series of roller bearings or ball bearings for allowing drive shaft 12 to rotate within support 10 with a minimum amount of friction.

Prior art FIG. 4 illustrates the typical manner in which rotatable chuck 6 is coupled to a conventional hand-held power drill. Chuck 6 has a central internally threaded bore 6' which is engaged by one end of a threaded spindle 18. The opposite end of threaded spindle 18 engages an internally threaded bore 20 within a rotatable drive member 19 within drill 4. Typically, the threaded bores 6' and 20 and the ends of spindle 18 each have a $\frac{3}{8}$ inch diameter and are threaded with 24 threads per inch. Other types of drills are also known wherein chuck 6 includes an externally threaded shaft extending from the rear portion thereof for directly engaging bore 20 of rotatable drive member 19, in which case spindle 18 is omitted.

As shown best in FIGS. 2 and 5, drive shaft 12 is provided with an internally threaded bore 16 concentric with its axis of rotation and with the drilling axis. Bore 16 has a $\frac{3}{8}$ inch diameter and is threaded with 24 threads per inch. Spindle 18 (see FIG. 4) is used to couple drive shaft 12 to rotatable drive member 19. A second spindle 21, similar to spindle 18, is utilized to couple drive shaft 12 to chuck 6.

In the event that the leveling mechanism is to be used in conjunction with a drill of the type wherein the chuck has an externally threaded shaft extending from the rear portion thereof, then the shaft of the chuck 6 is threaded directly into bore 16 of drive shaft 12, and spindle 21 is omitted. As before, spindle 18 is utilized to couple drive shaft 12 to rotatable drive member 20 within the drill 4.

Referring to FIGS. 1–3, support 10 includes a first planar surface 22 disposed perpendicular to the axis of rotation 17 of drive shaft 12. Support 10 also includes a second planar surface 24 disposed perpendicular to planar surface 22 and parallel to the axis of rotation 17 of drive shaft 12. A first bubble level 23 is supported by planar surface 22, and a second bubble level 25 is supported by planar surface 24. Bubble levels 23 and 25 may be circular bubble levels of the type commercially available from Johnson Products Company of Milwaukee, Wis., under the designation "Surface Level".

In order to prevent support 10 from rotating along with drive shaft 12 when the drill is operated, support 10 is releasably secured to the housing of drill 4. As shown in FIGS. 1–3, the portion of support 10 beneath planar surface 24 may include a curved surface 27 generally contoured to the shape of a conventional drill housing. A layer of elastic material 28 is secured to contoured surface 27 for further insuring a snug fit between support 10 and the drill housing. Alternatively, support 10 may be secured against rotation by a bracket arrangement to be more fully described below in regard to FIGS. 10–12. If this alternate securing arrangement is utilized, a hole 30 is provided within support 10 adjacent the rear portion of planar surface 24 for engaging the tab of the securing bracket.

Those skilled in the art will realize that alignment of planar surfaces 22 and 24 (and the bubble levels supported thereby) with the drilling axis is readily achieved without any further adjustment merely by coupling drive shaft 12 of support 10 between chuck 6 and drill 4. Moreover, such alignment is achieved irrespective of whether the drill housing is provided with planar surfaces parallel or perpendicular to the drilling axis. Although support 10 is secured to the drill housing, such securement is merely to prevent rotational movement of support 10 and does not in any way affect the alignment of planar surfaces 22 and 24 with respect to the drilling axis.

In order to utilize leveling mechanism 2 for drilling a vertical hole, drill 4 is positioned to direct drill bit 7 in a generally vertical direction; the operator then observes bubble level 23 and repositions drill 4 until the bubble within level 23 is centered. The operator then activates the drill while guiding the drill to maintain the bubble within level 23 in the center thereof. In order to drill a horizontal hole, drill 4 is positioned to direct drill bit 7 in a generally horizontal direction; the operator then observes bubble level 25 and repositions the drill 4 until the bubble within level 25 is centered. The operator then activates the drill while guiding the drill to maintain the bubble within level 25 in the center thereof. When the leveling mechanism is no longer needed, it may easily be removed from between the drill and the chuck whereupon the chuck may be reconnected directly to the drill in the manner illustrated in FIG. 4.

In some types of conventional drills, the rotatable chuck is integral with the drill and hence is not easily removable therefrom. In order to accommodate drills of this type, the leveling mechanism described above may be modified in the manner illustrated in FIGS. 6 and 7. As shown in FIG. 6, arbor 32 is provided with a short threaded end 34 and a longer smooth end 36. Referring to FIG. 7, threaded end 34 engages threaded bore 16 of drive shaft 12 while smooth end 36 is secured within the jaws of chuck 6 for rotation therewith. Threaded spindle 21 has a first end threadedly engaged with bore 16 of drive shaft 12 and a second end threadedly engaged with a bore 38 within a second chuck 40. Drill bit 7 is secured within the jaws of second chuck 40 for rotation therewith.

As shown in FIG. 7, support 10 is generally further from drill 4 then in the embodiment illustrated in FIG. 1 due to the presence of chuck 6 between drive shaft 12 and drill 4. In order to secure support 10 against rotational movement, contoured surface 27 may be extended in length commensurate with the length of chuck 6 for allowing support 10 to engage the drill housing. Alternatively, if a support bracket clamped to the drill housing is used to engage hole 30 within support 10, then the length of the support bracket need only be extended commensurate with the length of chuck 6, and support 10 need not be modified.

In FIGS. 8 and 9, the leveling mechanism illustrated in FIG. 1 is shown after being modified to include a gravity activated angle indicator 42. Support 10 includes a third planar surface 44 extending perpendicular to planar surfaces 22 and 24, and angle indicator 42 is supported by planar surface 44. As shown more clearly in FIG. 9, angle indicator 42 includes an eccentrically pivoted member 46 including a pointer 48 at the lower portion thereof. A series of indicia 50 are spaced around angle indicator 42 adjacent the periphery thereof for indicating the angular relationship of support 10 with respect to a vertical reference designated by pointer 48. Thus, an operator can drill a hole at any desired angle with respect to true vertical by positioning the drill so as to maintain pointer 48 adjacent the desired angle marking printed on the periphery of angle indicator 42. Angle indicator 42 may be of the type commercially available from the Pro Products Company, Inc. of Rockford, Ill. under the designation "ANGLE FINDER, Model 30".

Figure 11:
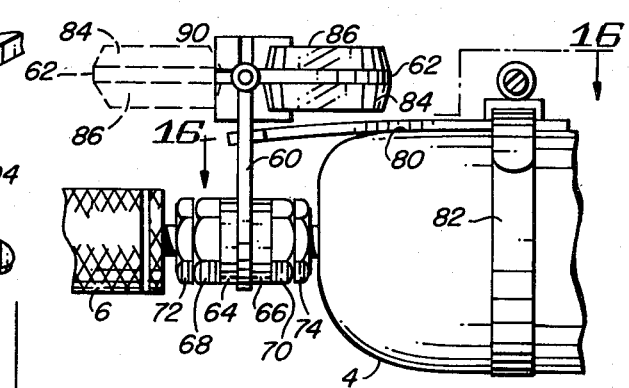
FIG. 11 is a side view of the leveling mechanism shown in FIG. 10 coupled between a drill and a chuck and positioned for drilling a horizontal hole.
Figures 13, 14:
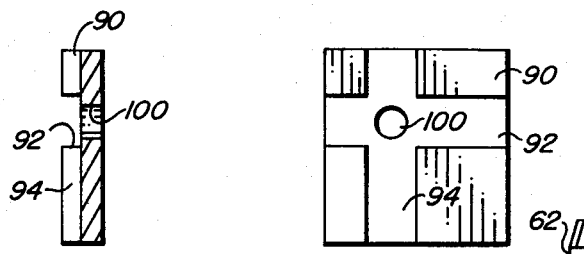
FIG. 13 is a cross-sectional view of a grooved alignment plate taken through lines 13—13 shown in FIG. 10.
FIG. 14 is a front view of the alignment plate.
Figure 12:
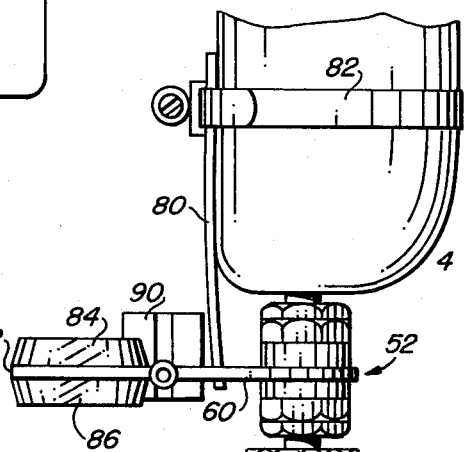
FIG. 12 is a side view of the leveling mechanism shown in FIG. 10 coupled between a drill and a chuck and positioned for drilling a vertical hole.

FIGS. 10–16 illustrate a leveling mechanism according to a second embodiment of the present invention. Referring in particular to FIGS. 10–12, the leveling mechanism is designated generally by reference numeral 52 and is adapted to be coupled between drill 4 and rotatable chuck 6. Leveling mechanism 52 includes a threaded drive shaft 54 having a first end 56 for threadedly engaging a central bore within chuck 6 and a second end 58 for threadedly engaging a central bore 20 within rotatable drive member 19 (see FIG. 4) of drill 4. Preferably, drive shaft 54 has a ⅜ inch diameter and is threaded with 24 threads per inch to be compatible with the majority of drills now available.

Drive shaft 54 is rotatably secured to a hinged support which includes a support plate 60 and a level plate 62. In the preferred embodiment, support plate 60 includes a hole through which drive shaft 54 is passed. Support plate 60 is disposed betweeen a pair of sealed cone thrust bearing assemblies 64 and 66 which rotatably secure drive shaft 54 to support plate 60 and which maintain support plate 60 perpendicular to the axis of rotation of drive shaft 54. Adjustment nuts 68 and 70 are threaded onto drive shaft 54 adjacent bearing assemblies 64 and 66, respectively, for adjusting the looseness or end-play thereof. Locking nuts 72 and 74 are threaded onto drive shaft 54 adjacent adjustment nuts 68 and 70, respectively, for restricting movement of adjustment nuts 68 and 70 relative to drive shaft 54.

Figure 16:
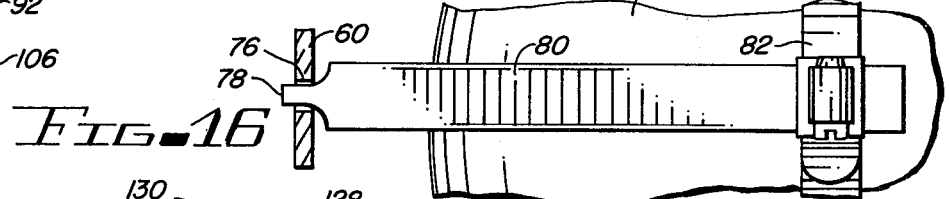
FIG. 16 is a partial cross-sectional view taken through line 16—16 shown in FIG. 11 and illustrates a securing bracket clamped to the drill housing for preventing the support from rotating.

In order to secure support plate 60 against rotational movement when the drill is operated, a hole 76 is formed within support plate 60 for engaging a tab 78 at one end of securing bracket 80; the opposite end of bracket 80 is clamped against the housing of drill 4 by an adjustable band clamp 82, as shown in FIGS. 11, 12 and 16. Support bracket 80 may be made of metal and is preferably coated with a layer of plastic for allowing bracket 80 to snugly engage the drill housing when clamped thereto.

Those skilled in the art will realize that upon attaching leveling mechanism 52 between chuck 6 and drill 4, support plate 60 is maintained in a perpendicular relationship with the drilling axis. Securing bracket 80 merely restricts rotational movement of support plate 60 and does not in any way affect the alignment of support plate 60 with respect to the drilling axis.

As shown in FIGS. 10–12, level plate 62 includes first and second opposing faces for supporting first and second bubble levels 84 and 86, respectively. Bubble levels 84 and 86 may be of the circular type commercially available from Johnson Products Company of Milwaukee, Wis. A bolt 88 extends through the hinged portions of support plate 60 and level plate 62 for pivotally attaching level plate 62 to support plate 60.

In order to maintain level plate 62 in a predetermined angular relationship with support plate 60, and hence with the drilling axis, an alignment plate 90 is provided having a pair of grooves 92 and 94 for releasably engaging edge 96 of support plate 60 and edge 98 of level plate 62. The width of grooves 92 and 94 is substantially equal to the thickness of support plate 60 and level plate 62. As shown best in FIG. 14, grooves 92 and 94 are perpendicular to one another and intersect at a common point at which a circular hole 100 is formed. As shown in FIG. 10, hole 100 is passed over the threaded end portion 102 of bolt 88, and a wing nut 104 is then threaded over the end 102 of bolt 88 for releasably securing alignment plate 90 against edges 96 and 98.

When using leveling mechanism 52 in order to drill a horizontal hole, wing nut 104 is loosened, and level plate 62 is positioned in a direction generally perpendicular to support plate 60. Alignment plate 90 is then positioned to engage edge 96 within one of the grooves 92 and 94, and to engage edge 98 within the other groove. Wing nut 104 is then tightened to secure alignment plate 90 against the edges of support plate 60 and level plate 62. As shown in FIG. 11, level plate 62 may be positioned to extend toward drill 4 such that bubble level 86 faces upward and bubble level 84 faces downward. Alternatively, level plate 62 may be extended away from drill 4 and toward chuck 6, as indicated by the dashed lines in FIG. 11, so that bubble level 84 faces upward and bubble level 86 faces downward. In either case, the drill is positioned to direct the drill bit engaged by chuck 6 in a generally horizontal direction, and the operator then observes the upwardly facing bubble level while repositioning the drill until the bubble within the upwardly facing level is centered. The operator then activates the drill and guides the drill to maintain the bubble in the upwardly facing level in the center thereof.

On the other hand, to drill a vertical hole, wing nut 104 is again loosened and level plate 62 is repositioned to extend substantially co-planar with support plate 60. Alignment plate 90 is then advanced toward edges 96 and 98 for engaging both such edges within a single groove 92 or 94. Wing nut 104 is then tightened to secure alignment plate 90 against the edges of support plate 60 and level plate 62. The drill is positioned to direct the drill bit engaged by chuck 6 in a generally vertical direction, and the operator then observes bubble level 84 while repositioning the drill until the bubble is centered within level 84. The operator then activates the drill while guiding the drill in order to maintain the bubble in the center of level 84.

Those skilled in the art will realize that bubble level 86 may be omitted provided that level plate 62 is utilized solely in the dashed position shown in FIG. 11 when drilling horizontal holes. However, it has been found that inclusion of second bubble level 86 is advantageous for the reason that level plate 62 is less likely to interfere with the operator's view of the work area if level plate 62 extends toward drill 4 and bubble level 86 faces upward when leveling mechanism 52 is being utilized to drill a horizontal hole.

Figure 15:
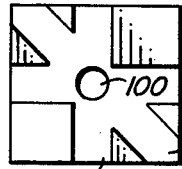
FIG. 15 is a front view of an alignment plate similar to that shown in FIG. 14 but modified to allow drilling at a 45° angle relative to a vertical axis.

Those skilled in the art will also realize that alignment plate 90 may include one or more alignment grooves in addition to grooves 92 and 94, as shown in FIG. 15. Groove 106 is provided at a 45° angle to grooves 92 and 94 for allowing level plate 62 to be positioned at an angle of 45° or 135° with respect to support plate 60 in order to drill holes at a 45° angle to a vertical reference. Similarly, alignment plate 90 may include other grooves disposed at other desired angles from one another.

Figure 17:
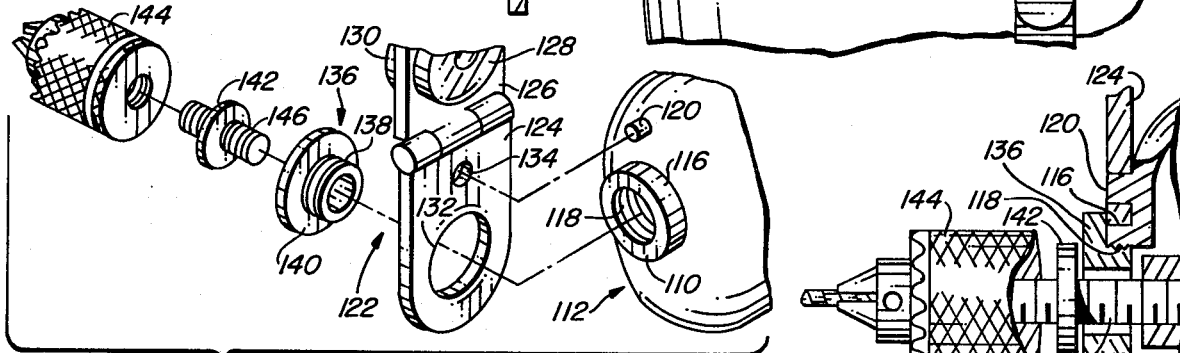
FIG. 17 is an exploded perspective view of a leveling mechanism for use in conjunction with a modified drill housing.
Figure 18:
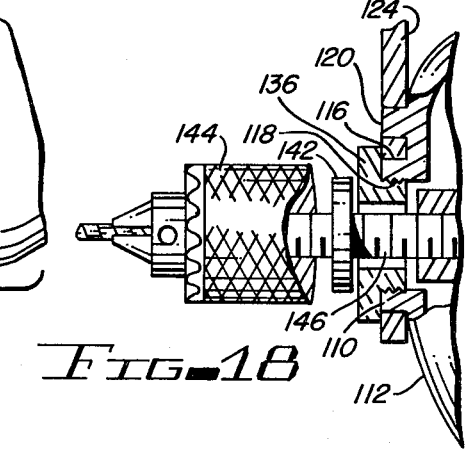
FIG. 18 is a cross-sectional view of the apparatus shown in FIG. 17.

Another embodiment of the present invention is illustrated in FIGS. 17 and 18. With regard to this embodiment, a conventional drill housing is modified slightly to allow a leveling mechanism to be quickly and easily attached to or removed from the drill while maintaining proper alignment between the leveling mechanism and the drilling axis. As shown in FIGS. 17 and 18, a circular projection 110 extends from the front face 112 of a drill housing, projection 110 surrounding the aperture conventionally provided within the front face of a drill for allowing access to rotatable drive member 114 therein. Projection 110 includes a smooth, cylindrical outer periphery 116 and a circular, internally threaded inner periphery 118, both of which are concentric with the axis of rotation of rotatable drive member 114. An alignment peg 120 extends from the front face 112 of the drill housing above projection 110.

A leveling mechanism 122 generally similar to that shown in FIG. 10 includes a hinged support having a support plate 124 and a level plate 126 hingedly attached thereto for supporting bubble levels 128 and 130 on opposing faces of level plate 126. An alignment plate of the type shown in FIGS. 13–15 may be utilized in conjunction with support plate 124 and level plate 126 for maintaining a predetermined angular relationship therebetween. Support plate 124 has a first circular hole 132 formed therein having a diameter substantially equal to the diameter of cylindrical outer periphery 116. Support plate 124 also has a second hole 134 formed therein above hole 132 for being engaged by alignment peg 120.

A collar 136 is also provided for securing support 124 against drill housing 112. The collar includes a tubular, externally threaded portion 138 at a first end thereof for threadedly engaging the inner periphery 118 of projection 110. Collar 136 also includes an outwardly extending rim 140 at the end opposite threaded portion 138 for contacting support 124 and urging it against front face 112 of the drill housing. Because outer periphery 116 and inner periphery 118 of projection 110 are each concentric with the drilling axis, support plate 124 is maintained in a position perpendicular to the drilling axis. Alignment peg 120 and second hole 134 serve to maintain leveling mechanism 122 upright relative to the drill housing while collar 136 is being threaded into projection 110.

A conventional threaded spindle 142 couples chuck 144 to rotatable drive member 114 within the drill housing. As shown in FIG. 18, the threaded end 146 of spindle 142 which engages rotatable drive member 114 extends through collar 138 when leveling mechanism 122 is being utilized.

The minor modifications made to the front face 112 of the drill housing described above allow leveling mechanism 122 to be quickly and easily attached to or removed from the drill while insuring that leveling mechanism 122 is properly algined with respect to the drilling axis when in use.

Those skilled in the art will now appreciate that a leveling mechanism has been described for use in conjunction with a hand-held power drill, wherein the leveling mechanism may be easily attached to or removed from the drill, and wherein the leveling mechanism is properly aligned with respect to the drilling axis immediately upon attachment to the drill. While the invention has been described with reference to a plurality of preferred embodiments thereof, the description is for illustrative purposes only and is not to be construed as limiting the scope of the invention. Various modifications and changes may be made by those skilled in the art without departing from the true spirit and scope of the invention as defined by the appended claims.

I claim:

1. A leveling mechanism for use in conjunction with a drill, the drill including a rotatable drive member for rotating a chuck, the rotatable drive member having a threaded central bore formed therein, said leveling mechanism comprising in combination:
   (a) a support;
   (b) a drive shaft rotatably mounted to said support and having an axis of rotation, said drive shaft having first and second ends, the first end of said drive shaft being coupled to said chuck, and the second end of said drive shaft being externally threaded and of a diameter commensurate with that of the threaded central bore within the rotatable drive member, said externally threaded second end of said drive shaft being received directly by the threaded central bore within the rotatable drive member for rotating the chuck;
   (c) said support being maintained at a substantially fixed point along the rotational axis of said drive shaft and at a substantially fixed distance from said drill and relatively proximate thereto for minimizing the distance between the drill and the chuck rotated thereby; and
   (d) a first bubble level attached to said support to aid a user in holding the drill in a predetermined position.

2. A leveling mechanism as recited in claim 1 wherein the drill includes a housing and wherein said leveling mechanism includes securing means for securing said support to the drill housing to restrict rotational movement of said support relative to the drill housing.

3. A leveling mechanism as recited in claim 2 wherein said securing means includes a bracket having first and second ends, the first end of said bracket engaging said support, said securing means also including means for securing the second end of said bracket to the drill housing.

4. A leveling mechanism as recited in claim 1 wherein the drill includes a housing and wherein said support includes a contoured surface commensurate with the shape of a portion of the drill housing, said contoured surface engaging the portion of the drill housing to restrict rotational movement of said support relative to the drill housing.

5. A leveling mechanism as recited in claim 1 wherein said support includes a first planar surface perpendicular to the axis of rotation of said drive shaft for supporting said first bubble level, said support further including a second planar surface perpendicular to said first planar surface, and wherein said leveling mechanism includes a second bubble level supported by said second planar surface.

6. A leveling mechanism as recited in claim 1 further including gravity-activated angle indication means secured to said support for indicating the angular relationship between the axis of rotation of said drive shaft and true vertical.

7. A leveling mechanism as recited in claim 1 wherein said support includes a first portion to which said drive shaft is rotatably mounted and a second portion hinged to said first portion for supporting said first bubble level.

8. A leveling mechanism as recited in claim 7 wherein said support further includes securing means for releasably securing said second portion in a predetermined position relative to said first portion.

9. A leveling mechanism as recited in claim 8 wherein said first and second portions each have an edge, and wherein said securing means includes a plate having a plurality of grooves for releasably engaging the edges of said first and second portions to maintain the second portion in a predetermined position relative to said first portion.

10. A leveling mechanism as recited in claim 9 wherein said plurality of grooves includes first and second grooves extending perpendicular to each other for maintaining said second portion perpendicular to said first portion.

11. A leveling mechanism as recited in claim 7 wherein said second portion has first and second opposing faces and wherein said first bubble level is supported by said first face, said leveling mechanism including a second bubble level supported by said second face.

12. A leveling mechanism for use in conjunction with a drill, the drill including a rotatable drive means for rotating a chuck, the rotatable drive means including an externally threaded shaft adapted to be threadedly coupled with the chuck, said leveling mechanism comprising in combination:
   (a) a support;
   (b) a drive shaft rotatably mounted to said support and having an axis of rotation, said drive shaft having first and second ends, the first end of said drive shaft being coupled to said chuck, and the second end of said drive shaft having a threaded central bore formed therein of a diameter commensurate with that of the externally threaded shaft of the rotatable drive means, the externally threaded shaft of said rotatable drive means being received directly by the threaded central bore within the second end of said drive shaft for rotating the chuck;

(c) said support being maintained at a substantially fixed point along the rotational axis of said drive shaft and at a substantially fixed distance from said drill and relatively proximate thereto for minimizing the distance between the drill and the chuck rotated thereby; and (d) a first bubble level attached to said support to aid a user in holding the drill in a predetermined position.

13. A leveling mechanism as recited in claim 12 wherein the drill includes a housing and wherein said leveling mechanism includes securing means for securing said support to the drill housing to restrict rotational movement of said support relative to the drill housing.

14. A leveling mechanism as recited in claim 13 wherein said securing means includes a bracket having first and second ends, the first end of said bracket engaging said support, said securing means also including means for securing the second end of said bracket to the drill housing.

15. A leveling mechanism as recited in claim 12 wherein said support includes a first planar surface perpendicular to the axis of rotation of said drive shaft for supporting said first bubble level, said support further including a second planar surface perpendicular to said first planar surface, and wherein said leveling mechanism includes a second bubble level supported by said second planar surface.

16. A leveling mechanism as recited in claim 12 wherein said support includes a first portion to which said drive shaft is rotatably mounted and a second portion hinged to said first portion for supporting said first bubble level.

17. A leveling mechanism as recited in claim 16 wherein said support further includes securing means for releasably securing said second portion in a predetermined position relative to said first portion.

18. A leveling mechanism as recited in claim 17 wherein said first and second portions each have an edge, and wherein said securing means includes a plate having a plurality of grooves for releasably engaging the edges of said first and second portions to maintain the second portion in a predetermined position relative to said first portion.

19. A leveling mechanism as recited in claim 18 wherein said plurality of grooves includes first and second grooves extending perpendicular to each other for maintaining said second portion perpendicular to said first portion.

20. A leveling mechanism as recited in claim 16 wherein said second portion has first and second opposing faces and wherein said first bubble level is supported by said first face, said leveling mechanism including a second bubble level supported by said second face.

21. A leveling mechanism as recited in claim 12 wherein the drill includes a housing and wherein said support includes a contoured surface commensurate with the shape of a portion of the drill housing, said contoured surface engaging the portion of the drill housing to restrict rotational movement of said support relative to the drill housing.

22. A leveling mechanism as recited in claim 12 further including gravity-activated angle indication means secured to said support for indicating the angular relationship between the axis of rotation of said drive shaft and true vertical.

* * * * *